United States Patent
Kondoh et al.

(10) Patent No.: US 10,120,222 B2
(45) Date of Patent: Nov. 6, 2018

(54) DISPLAY DEVICE

(71) Applicant: Panasonic Liquid Crystal Display Co., Ltd., Hyogo (JP)

(72) Inventors: Hiroki Kondoh, Hyogo (JP); Tsutomu Abe, Hyogo (JP); Masaki Tsubokura, Hyogo (JP); Mamoru Kuramoto, Hyogo (JP); Naotoshi Sumiya, Hyogo (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 64 days.

(21) Appl. No.: 15/194,573

(22) Filed: Jun. 28, 2016

(65) Prior Publication Data

US 2016/0377909 A1  Dec. 29, 2016

(30) Foreign Application Priority Data

Jun. 29, 2015 (JP) ................................ 2015-130401

(51) Int. Cl.
*G02F 1/1333* (2006.01)

(52) U.S. Cl.
CPC .................. *G02F 1/133308* (2013.01); *G02F 2001/133314* (2013.01); *G02F 2201/46* (2013.01); *G02F 2202/28* (2013.01)

(58) Field of Classification Search
CPC ................. G02F 2202/28; G02F 2001/133314
See application file for complete search history.

(56) References Cited

U.S. PATENT DOCUMENTS

| | | | |
|---|---|---|---|
| 7,978,284 B2 * | 7/2011 | Hashino | G02F 1/133615 349/110 |
| 2016/0170130 A1 * | 6/2016 | Jin | G02B 6/0055 349/65 |

FOREIGN PATENT DOCUMENTS

JP  2004-361654 A  12/2004

* cited by examiner

*Primary Examiner* — Kendrick Hsu
(74) *Attorney, Agent, or Firm* — HEA Law PLLC

(57) ABSTRACT

Provided is a display device, comprising: a display panel; a frame that holds the display panel; and an adhesive member to adhesively fix the display panel and the frame to each other. The adhesive member includes a base material, a first adhesive layer disposed on a surface on the display panel side of the base material, and a second adhesive layer disposed on a surface on a frame side of the base material. In planar view, the first adhesive layer and the second adhesive layer are disposed in at least a part of the adhesive member so as not to overlap each other, and a clearance is formed between the first adhesive layer and the second adhesive layer.

9 Claims, 5 Drawing Sheets

DISPLAY DEVICE

CROSS-REFERENCE TO RELATED APPLICATION

The present application claims priority from Japanese application JP 2015-130401 filed on Jun. 29, 2015, the content of which is hereby incorporated by reference into this application.

BACKGROUND

1. Technical Field

This application relates to a display device, and more particularly to a structure of an adhesive member to fix a display panel and a backlight unit.

2. Description of the Related Art

A display device includes a display panel, and a backlight unit disposed on a back surface side of the display panel. The display panel and the backlight unit are adhesively fixed by an adhesive member in a sticking process. The adhesive member is disposed between a peripheral portion of the display panel and a peripheral portion of a fame making up the backlight unit. The adhesive member is made up of, for example, a base material made of resin, and double-sided adhesive tapes which are stuck to both surfaces (a surface on a display panel side and a surface on a frame side) of the base material disclosed in a prior art (See Japanese Patent Application Laid-open No. 2004-361654).

However, with the conventional constitution, when deformation such as a warp occurs in the display panel, the frame or the like, a load is applied on the display panel, which causes an image defect.

The present disclosure is achieved in light of the above-described problem, and an object thereof is to provide a display device capable of preventing degradation in image quality accompanied by deformation of a display panel, a frame or the like.

SUMMARY

In one general aspect, the instant application describes a display device includes: a display panel; a frame that holds the display panel; and an adhesive member to adhesively fix the display panel and the frame to each other. The adhesive member includes a base material, a first adhesive layer disposed on a surface on the display panel side of the base material, and a second adhesive layer disposed on a surface on a frame side of the base material. In planar view, the first adhesive layer and the second adhesive layer are disposed in at least a part of the adhesive member so as not to overlap each other, and a clearance is formed between the first adhesive layer and the second adhesive layer.

The above general aspect may include one or more of the following features. In planar view, the first adhesive layer and the second adhesive layer are disposed alternately in an extending direction of the base material.

In planar view, the first adhesive layer and the second adhesive layer are disposed side by side in a direction perpendicular to an extending direction of the base material.

In planar view, one of the first adhesive layer and the second adhesive layer is formed in a comb teeth shape, and the other is disposed in regions between comb teeth.

In planar view, the first adhesive layer and the second adhesive layer are disposed in matrix.

In a region corresponding to the clearance in the base material, a cutout portion is formed.

The display device further includes a driver IC that drives a signal line disposed in the display panel. The first adhesive layer is disposed in a layer under the driver IC.

The base material is made of polycarbonate or polyethylene terephthalate, and the first adhesive layer and the second adhesive layer are each made of a double-sided adhesive tape.

DETAILED DESCRIPTION

An embodiment of the present application is described below with reference to the drawings. The embodiment of the present application takes a liquid crystal display device as an example of a display device of the present application. However, the present application is not limited thereto and the display device may be an organic EL display device, for example.

Figure 1:
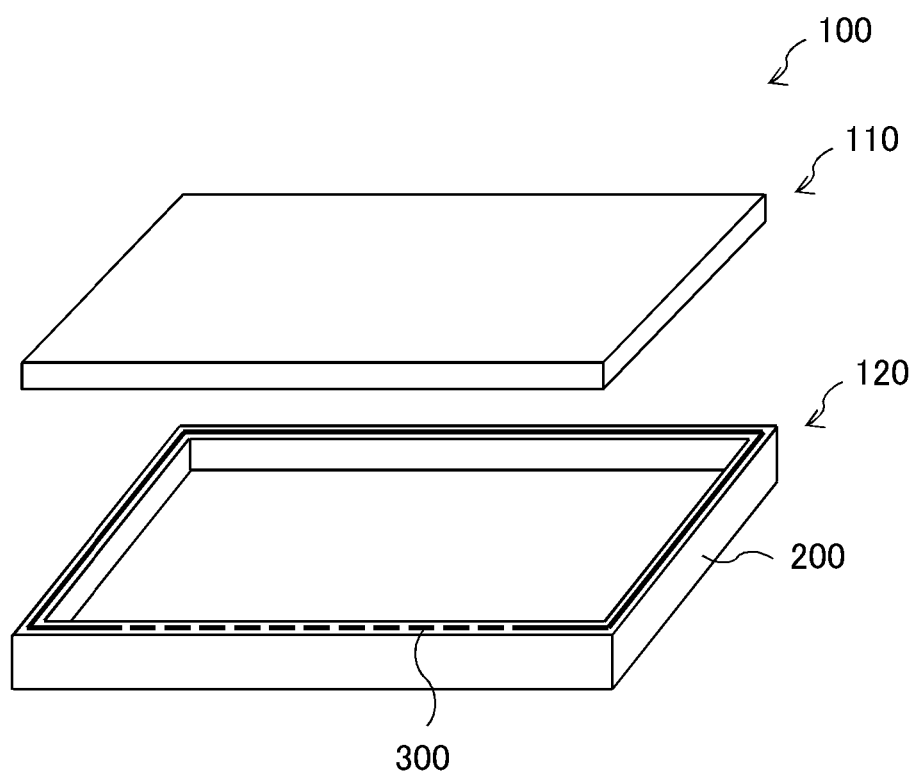
FIG. 1 is an exploded perspective view showing an outline of the whole configuration of a liquid crystal display device.

FIG. 1 is an exploded perspective view showing an outline of the whole configuration of a liquid crystal display device 100 according to the present embodiment, The liquid crystal display device 100 mainly includes a display panel 110, a backlight unit 120 disposed on a back surface side of the display panel 110. The backlight unit 120 includes optical members such as a light source such as an LED and the like, a diffusion plate, an optical sheet and the like (none of them are shown), and a frame 200 that contains the optical members inside and holds the display panel 110. The frame 200 may be made up of a lower frame that contains the optical members, and a holding frame that holds the display panel 110. In a peripheral portion between the display panel 110 and the backlight unit 120, an adhesive member 300 to adhesively fix the display panel 110 and the backlight unit 120 is disposed. FIG. 1 shows a state where the adhesive member 300 is adhesively fixed onto the frame 200.

Figure 2:
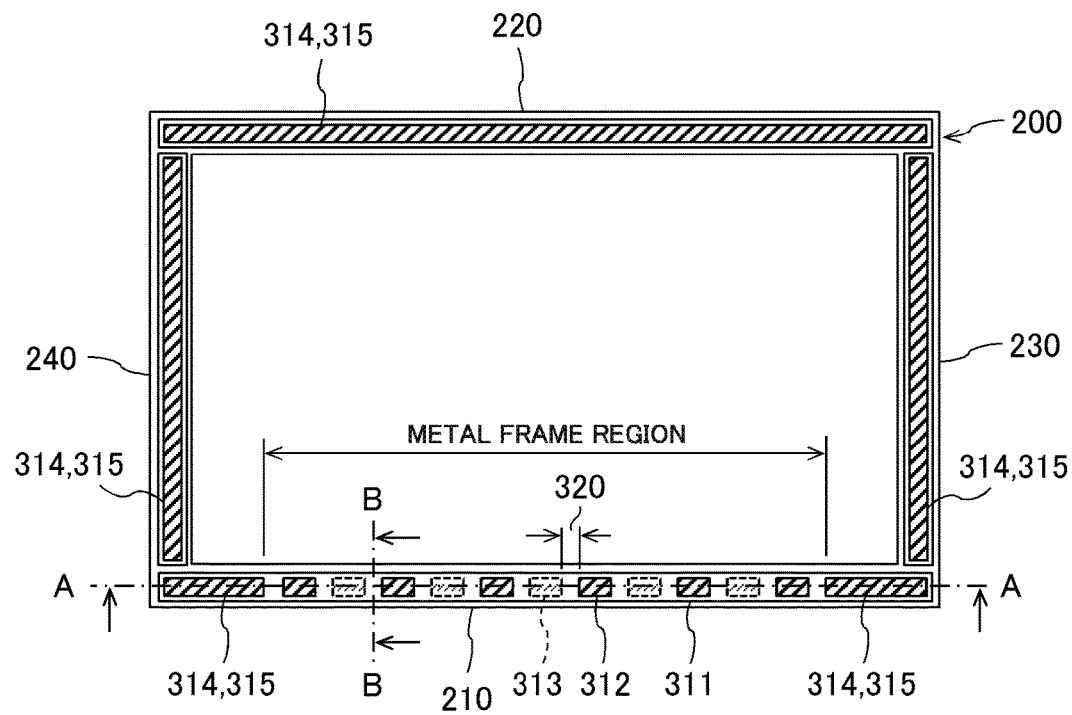
FIG. 2 is a plan view showing a constitution of the adhesive member.
Figure 3:
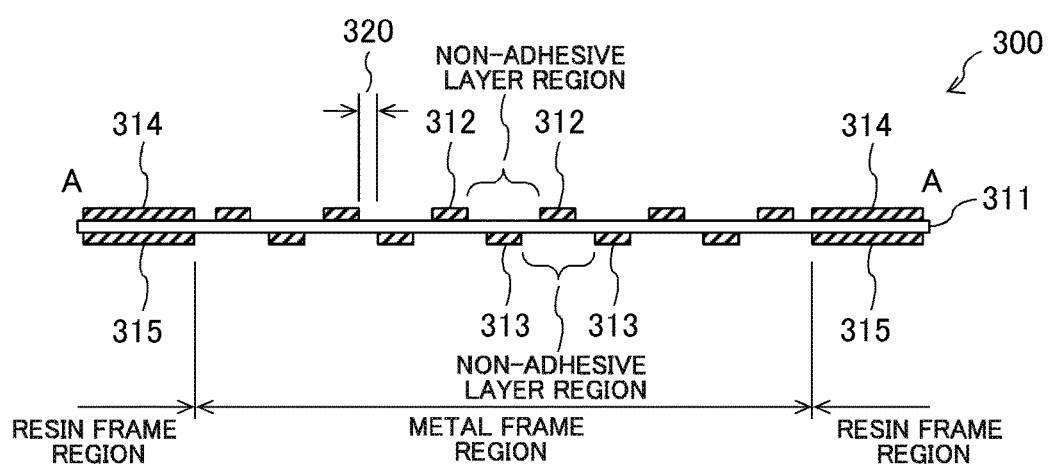
FIG. 3 is a cross-sectional view along A-A in FIG. 2.
Figure 4:
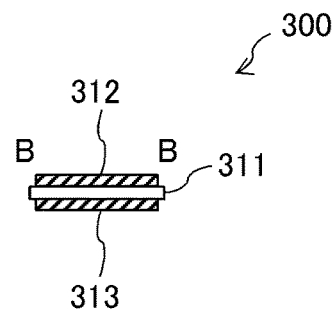
FIG. 4 is a cross sectional view along B-B in FIG. 2.

FIG. 2 is a plan view showing a constitution of the adhesive member 300, FIG. 3 is a cross-sectional view along A-A in FIG. 2, and FIG. 4 is a cross sectional view along B-B in FIG. 2. The adhesive member 300 includes a base material 311, first adhesive layers 312 stuck to one surface (a surface on a display panel side) of the base material 311, and second adhesive layers 313 stuck to another surface (a surface on a frame side) of the base material 311. The base material 311 is made of resin such as polycarbonate and polyethylene-terephthalate (PET). The first adhesive layers 312 and the second adhesive layers 313 are each made of a double-sided adhesive tape having a light shielding property. As shown in FIGS. 3 and 4, as for each of the first adhesive layers 312, one surface thereof is stuck to the base material 311, and another surface is stuck to the display panel 110. As for each of the second adhesive layers 313, one surface thereof is stuck to the base material 311, and another surface is stuck to the frame 200. In FIG. 2, the second adhesive layers 313 stuck to a back surface of the base material 311 are indicated by dotted line. As shown in FIG. 2, in planar view, the first adhesive layers 312 and the second adhesive layers 313 are disposed alternately in an extending direction (a longitudinal direction) of the base material 311, and are disposed so as not to overlap each other. Moreover, in planar view, a clearance 320 (non-superposition region) is formed between each of the first adhesive layers 312 and each of the second adhesive layers 313.

As shown in FIG. 3, on the display panel side of the base material 311, a non-adhesive layer region is formed between the adjacent first adhesive layers 312. Similarly, on the frame side of the base material 311, a non-adhesive layer region is formed between the adjacent second adhesive layers 313. A width, a length, and a thickness of each of the first adhesive layers 312 and the second adhesive layers 313 may be the same as each other, or may be different. Moreover, a shape of each of the first adhesive layers 312 and the second adhesive layers 313 may be the same as each other or may be different.

A surface (a surface opposed to the display panel) of the frame 200 is made up of a metal frame region and a resin frame region, A region opposed to a region in the display panel 110 where driver ICs are disposed is the metal frame region. In an example in FIG. 2, a surface in a central portion of a lower side frame 210 is the metal frame region. Surfaces on both end sides of the lower side frame 210, and surfaces of an upper side frame 220, a right side frame 230, and a left side frame 240 are a resin frame region. In the metal frame region, the first adhesive layers 312 and the second adhesive layers 313 are disposed. As shown in FIG. 3, in the resin frame region, upper adhesive layers 314 are stuck to the one surface (the surface on the display panel side) of the base material 311, and lower adhesive layers 315 are stuck to the other surface (the surface on the frame side) of the base material 311. As shown in FIG. 3, as to each of the upper adhesive layers 314, one surface thereof is stuck to the base material 311, and another surface is stuck to the display panel 110. As for each of the lower adhesive layers 315, one surface thereof is stuck to the base material 311, and another surface is stuck to the frame 200. In planar view, the upper adhesive layers 314 and the lower adhesive layers 315 have the same shape as each other, and are disposed so as to overlap each other.

Figure 5:
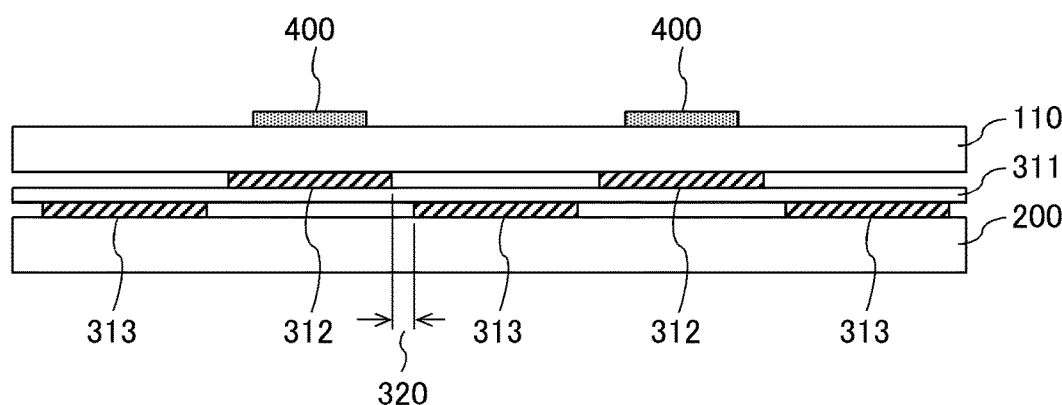
FIG. 5 is a side view of a state where the display panel and the frame are adhesively fixed through the adhesive member.

FIG. 5 is a side view of a state where the display panel 110 and the frame 200 are adhesively fixed through the adhesive member 300. In FIG. 5, a part of the metal frame region is shown in an enlarged manner. According to the constitution of the adhesive member 300 of the present embodiment, the first adhesive layers 312 and the second adhesive layers 313 disposed in different layers from each other with the base material 311 interposed are disposed so as not to overlap each other in planar view, and the clearances 320 are formed between the first adhesive layers 312 and the second adhesive layers 313 in planar view Thus, the non-adhesive layer region between the adjacent first adhesive layers 312 and the non-adhesive layer region between the adjacent second adhesive layers 313 can absorb deformation even if the deformation such as a warp occurs in the display panel 110 and the frame 200. This can prevent degradation in image quality accompanied by the deformation.

Since in the resin frame region, the resin frame can absorb the deformation, as shown in FIGS. 2 and 3, the first adhesive layers 312 and the second adhesive layers 313 need not be disposed. However, the present embodiment is not limited thereto, but the first adhesive layers 312 and the second adhesive layers 313 may be disposed in all the four sides of the frame 200 including the resin frame region. That is, it is preferable that the first adhesive layers 312 and the second adhesive layers 313 are disposed at least in the metal frame region.

Moreover, it is preferable that as shown in FIG. 5, the first adhesive layers 312 are disposed in a layer under the driver ICs 400. Moreover, the width of each of the first adhesive layers 312 is preferably wider than a width of each of the driver ICs 400. Since this can make small deformation (a deflection amount) in a region where the driver ICs 400 are installed in the display panel 110, the driver ICs 400 can be prevented from being damaged. Moreover, light leakage to the driver ICs 400 can be prevented.

Figure 6:
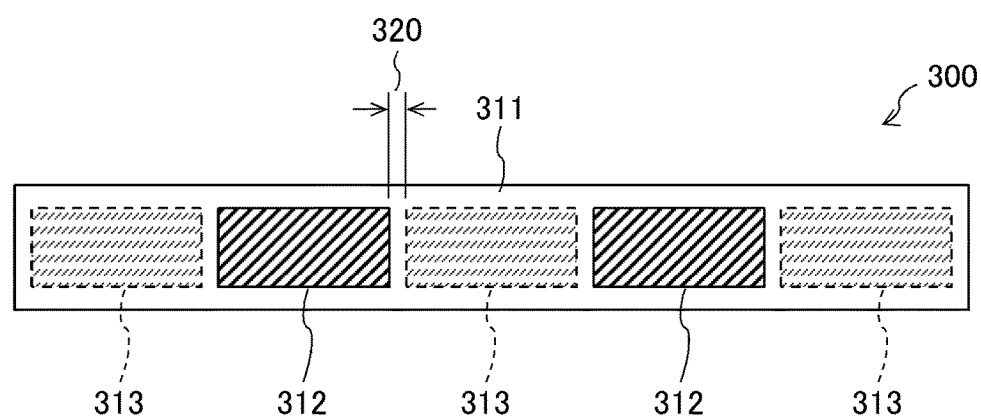
FIG. 6 is a partial enlarged view of the adhesive member corresponding to FIG. 2.
Figure 7:
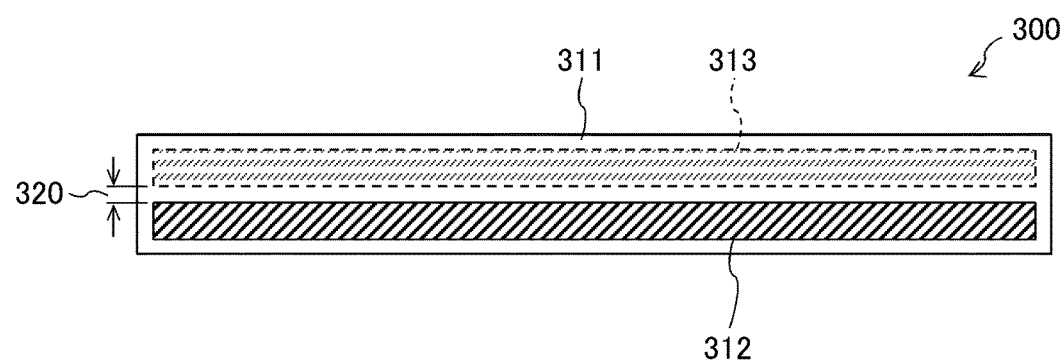
FIG. 7 is a plan view showing another constitution of the adhesive member.

FIG. 6 is a partial enlarged view of the adhesive member 300 corresponding to FIG. 2. In FIG. 6, the second adhesive layers 313 stuck to the back surface of the base material 311 are indicated by dotted line. The constitution of the adhesive member 300 is not limited to the above-described constitution. FIG. 7 is a plan view showing another constitution of the adhesive member 300. In the constitution in FIG. 7, the first adhesive layer 312 is disposed so as to extend in the same direction as an extending direction (the longitudinal direction) of the base material 311 in the one surface (the surface on the display panel side) of the base material 311, and the second adhesive layer 313 is disposed so as to extend in the same direction as the extending direction of the base material 311 in the other surface (the surface on the frame side) of the base material 311. Moreover, the first adhesive layer 312 and the second adhesive layer 313 are disposed side by side in a direction (a lateral direction) perpendicular to the extending direction of the base material 311. In planar view, the first adhesive layer 312 and the second adhesive layer 313 are disposed so as not to overlap each other, and the clearance 320 is formed between the first adhesive layer 312 and the second adhesive layer 313. According to the constitution in FIG. 7, the above-described deformation can be absorbed as in the constitution in FIG. 6, and a gap between the base material 311 and the display panel 110 can be filled with the first adhesive layer 312 and a gap between the base material 311 and the frame 200 can be filled with the second adhesive layer 313, which can also prevent a foreign substance from entering inside. The shape of each of the first adhesive layer 312 and the second adhesive layer 313 is not limited to a rectangular shape shown in FIG. 7, hut for example, may be a comb teeth shape, and the first adhesive layer 312 and the second adhesive layer 313 may be disposed so that teeth are mutually engaged.

Figure 8:
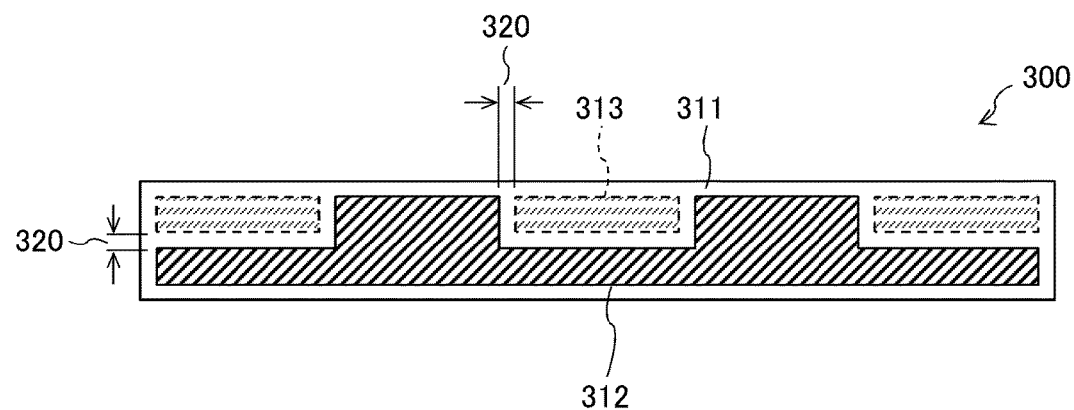
FIG. 8 is a plan view showing another constitution of the adhesive member.

FIG. 8 is a plan view showing another constitution of the adhesive member 300. In the constitution in FIG. 8, in the one surface (the surface on the display panel side) of the base material 311, the first adhesive layer 312 is disposed so as to extend in the same direction as the extending direction (the longitudinal direction) of the base material 311, and to extend in the direction (the lateral direction) perpendicular to the extending direction of the base material 311 at predetermined intervals. That is, the first adhesive layer 312 is formed in a comb teeth shape. The plurality of second adhesive layers 313 are disposed at predetermined intervals in the extending direction of the base material 311 in the other surface (the surface on the frame side) of the base material 311. In planar view, the second adhesive layers 313 are each disposed in a region between comb teeth of the first adhesive layer 312. Moreover, the first adhesive layer 312 and the second adhesive layers 313 are disposed so as not to overlap each other, and the clearance 320 is formed between the first 2.0 adhesive layer 312 and each of the second adhesive layers 313. The second adhesive layer 313 may be formed in a comb teeth shape, and the first adhesive layers 312 may be disposed in regions between comb teeth.

Figure 9:
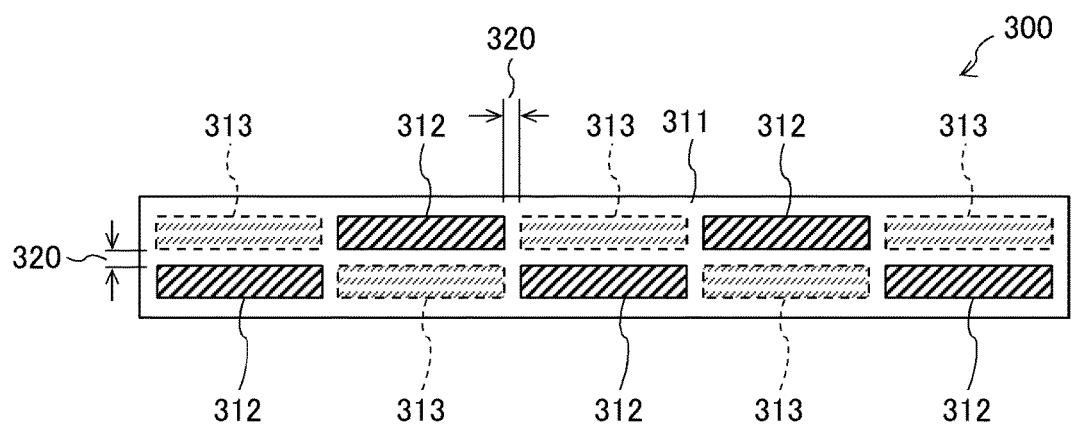
FIG. 9 is a plan view showing another constitution of the adhesive member.

FIG. 9 is a plan view showing another constitution of the adhesive member 300. In the constitution in FIG. 9, the first adhesive layers 312 are disposed on the one surface (the surface on the display panel side) of the base material 311, and the second adhesive layers 313 are disposed on the other surface (the surface on the frame side) of the base material 311. Moreover, as shown in FIG. 9, in planar view, the first adhesive layers 312 and the second adhesive layers 313 are disposed in matrix, and are disposed so as not to overlap each other, and the clearance 320 is formed between each of the first adhesive layers 312 and each of the second adhesive layers 313.

Figure 10:
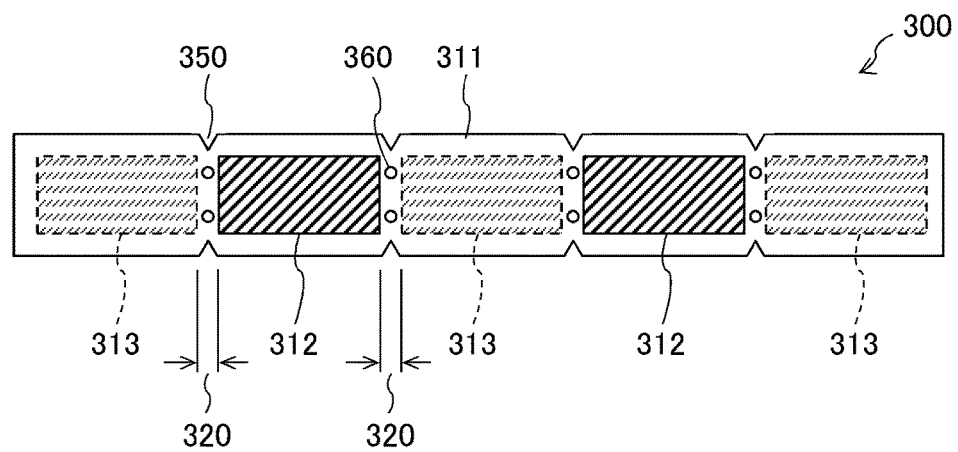
FIG. 10 is a plan view showing another constitution of the base material.

The base material 311 is not limited to the above-described constitutions. For example, as shown in FIG. 10, in a region corresponding to each of the clearances 320 in the base material 311, cutout portions 350 and opening portions 360 may be formed. Since this can increase flexibility of the adhesive member 300, the above-described deformation can be absorbed more. Shapes of the cutout portions 350 and the opening portions 360 are not limited.

While there have been described what are at present considered to be certain embodiments of the application, it will be understood that various modifications may be made thereto, and it is intended that the appended claims cover all such modifications as fall within the true spirit and scope of the invention.

What is claimed is:

1. A display device, comprising:
  a display panel;
  a frame that holds the display panel; and
  an adhesive member to adhesively fix the display panel and the frame to each other, wherein
  the adhesive member includes a base material, a first adhesive layer disposed on a surface on the display panel side of the base material, and a second adhesive layer disposed on a surface on a frame side of the base material, and
  in planar view, the first adhesive layer and the second adhesive layer are disposed in at least a part of the adhesive member so as not to overlap each other, and a clearance is formed between the first adhesive layer and the second adhesive layer,
  wherein the second adhesive layer attaches to a surface of the frame, and
  the first adhesive layer at least partially overlaps the surface of the frame in planar view.

2. The display device according to claim 1, wherein in planar view, the first adhesive layer and the second adhesive layer are disposed alternately in an extending. direction of the base material.

3. The display device according to claim 1, wherein in planar view, the first adhesive layer and the second adhesive layer are disposed side by side in a direction perpendicular to an extending direction of the base material.

4. The display device according to claim 1, wherein in planar view, one of the first adhesive layer and the second adhesive layer is formed in a comb teeth shape, and the other is disposed in regions between comb teeth.

5. The display device according to claim 1, wherein in planar view, the first adhesive layer and the second adhesive layer are disposed in matrix.

6. The display device according to claim 1, wherein in a region corresponding to the clearance in the base material, a cutout portion is formed.

7. The display device according to claim 1, further comprising a driver IC that drives a signal line disposed in the display panel, wherein
  the first adhesive layer is disposed in a layer under the driver IC.

8. The display device according to claim 1, wherein
  the base material is made of polycarbonate or polyethylene terephthalate, and
  the first adhesive layer and the second adhesive layer are each made of a double-sided adhesive tape.

9. The display device according to claim 1, wherein all area of the first adhesive layer overlaps the surface of the frame in planar view.

* * * * *